United States Patent
Casillas et al.

(10) Patent No.: US 6,726,154 B2
(45) Date of Patent: Apr. 27, 2004

(54) REUSABLE SPACE ACCESS LAUNCH VEHICLE SYSTEM

(75) Inventors: Eduardo D. Casillas, San Jose, CA (US); Charlie W. Shaeffer, Morgan Hill, CA (US); Claude R. Joyner, Palm Beach, FL (US); Randy C. Parsley, Palm Beach Gardens, FL (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 10/000,430

(22) Filed: Nov. 30, 2001

(65) Prior Publication Data

US 2003/0102408 A1 Jun. 5, 2003

(51) Int. Cl.$^7$ .................................................. B64G 1/40
(52) U.S. Cl. .................................... 244/172; 244/158 R
(58) Field of Search ........................... 244/158 R, 172, 244/2, 162, 160

(56) References Cited

U.S. PATENT DOCUMENTS

| | | | | |
|---|---|---|---|---|
| 4,452,412 A | * | 6/1984 | von Pragenau | |
| 4,802,639 A | * | 2/1989 | Hardy et al. | |
| 4,834,324 A | | 5/1989 | Criswell | |
| 4,884,770 A | * | 12/1989 | Martin | |
| 4,964,340 A | * | 10/1990 | Daniels et al. | |
| 5,101,622 A | * | 4/1992 | Bond | |
| 5,129,602 A | | 7/1992 | Leonard | |
| 5,207,399 A | * | 5/1993 | Risberg et al. | |
| 5,217,187 A | * | 6/1993 | Criswell | |
| 5,242,135 A | * | 9/1993 | Scott | |
| 5,251,852 A | * | 10/1993 | Pulkowski et al. | |
| 5,263,666 A | * | 11/1993 | Hubert et al. | |
| 5,295,642 A | * | 3/1994 | Palmer | |
| 5,961,078 A | * | 10/1999 | Edberg et al. | |
| 6,113,032 A | * | 9/2000 | Cochran et al. | |
| 2001/0010347 A1 | * | 8/2001 | Hart et al. | |
| 2002/0139901 A1 | * | 10/2002 | Penn | |

FOREIGN PATENT DOCUMENTS

FR  2636095  * 3/1990  ................ 244/172

* cited by examiner

Primary Examiner—Tien Dinh
(74) Attorney, Agent, or Firm—Bachman & LaPointe, P.C.

(57) ABSTRACT

The present invention relates to a reusable space access launch vehicle system which comprises a reusable vehicle, at least one expendable boost propulsion device attached to the reusable vehicle, and an oxidizer system onboard the vehicle. The oxidizer system supplies an oxidizer, preferably in a gaseous state, to the at least on expendable boost propulsion device. In a preferred embodiment, the at least one boost propulsion device comprises a hybrid rocket combustor.

12 Claims, 2 Drawing Sheets

REUSABLE SPACE ACCESS LAUNCH VEHICLE SYSTEM

BACKGROUND OF THE INVENTION

The present invention relates to a 1.5 stage symbiotic hybrid vehicle architecture and integral propulsion system for a reusable space access launch vehicle.

In order to continue, expand and maximize the utilization of space for orbital or interplanetary operations, it is necessary to develop a cost effective means to access space on a regular basis. Various launch vehicle architectures have been evaluated to derive the best approach to accomplish cost-effective space access.

The generally accepted premise for cost effective access to space is to use a fully reusable launch vehicle because the cost of hardware can be amortized over many flights, as opposed to expendable launch vehicles that must be fabricated, paid for, and expended for each individual space mission. Another launch vehicle element that has a significant impact on cost of space access is the number of stages configured into the launch vehicle. The cost of vehicle development and operations is proportional to the number of stages configured into the vehicle. Consequently, an optimal approach to space access would consist of a single stage to orbit reusable launch vehicle because it is fully reusable and has only a single stage.

Increasing the number of stages in a launch vehicle, however, has the benefit of reduced overall vehicle size, along with a required level of propulsion technology that is inversely proportional to the number of stages. A launch vehicle with multiple stages does not generally demand a high level of propulsion technology; conversely, reducing the number of propulsion stages requires a larger vehicle size and more demanding propulsion technology level. The most recent NASA experience with development of single stage to orbit reusable launch vehicles has demonstrated that the technology required to support and make this approach feasible is not yet available.

Therefore, in order to achieve reusable launch vehicle technical feasibility, people have focused on a two stage to orbit reusable launch vehicle approach to achieve cost-effective space access. The two stage to orbit approach offers full vehicle reusability, but it is estimated that it will require: (1) relatively high non-recurring development costs; and relatively complex vehicle architecture. The development of two reusable stages results in high non-recurring costs because it requires development programs for a fully reusable flyback booster and a reusable orbiter. Moreover, the relative complexity inherent in the two stage to orbit reusable launch vehicle approach can, to an extent, offset the cost benefits of reusability and result in increased recurring costs as well.

SUMMARY OF THE INVENTION

Accordingly, it is an object of the present invention to provide a reusable launch vehicle system which provides cost effective space access It is a further object of the present invention to provide a reusable launch vehicle system which has a 1.5 stage symbiotic hybrid vehicle architecture and an integrated propulsion system.

The foregoing objects are attained by the reusable launch vehicle system of the present invention.

In accordance with the present invention, a reusable launch vehicle system broadly comprises a reusable vehicle, at least one expendable boost propulsion device attached to the reusable vehicle, and an oxidizer system onboard the vehicle. The oxidizer system supplies oxidizer, preferably in a gaseous state, to the at least one expendable boost propulsion device. In a preferred embodiment of the present invention, the at least one expendable boost propulsion device comprises a hybrid rocket combustor.

Other details of the reusable launch vehicle of the present invention, as well as other objects and advantages attendant thereto, are set forth in the following detailed description and the accompanying drawings wherein like reference numerals depict like elements.

DETAILED DESCRIPTION OF THE PREFERRED EMBODIMENT(S)

Figure 1:
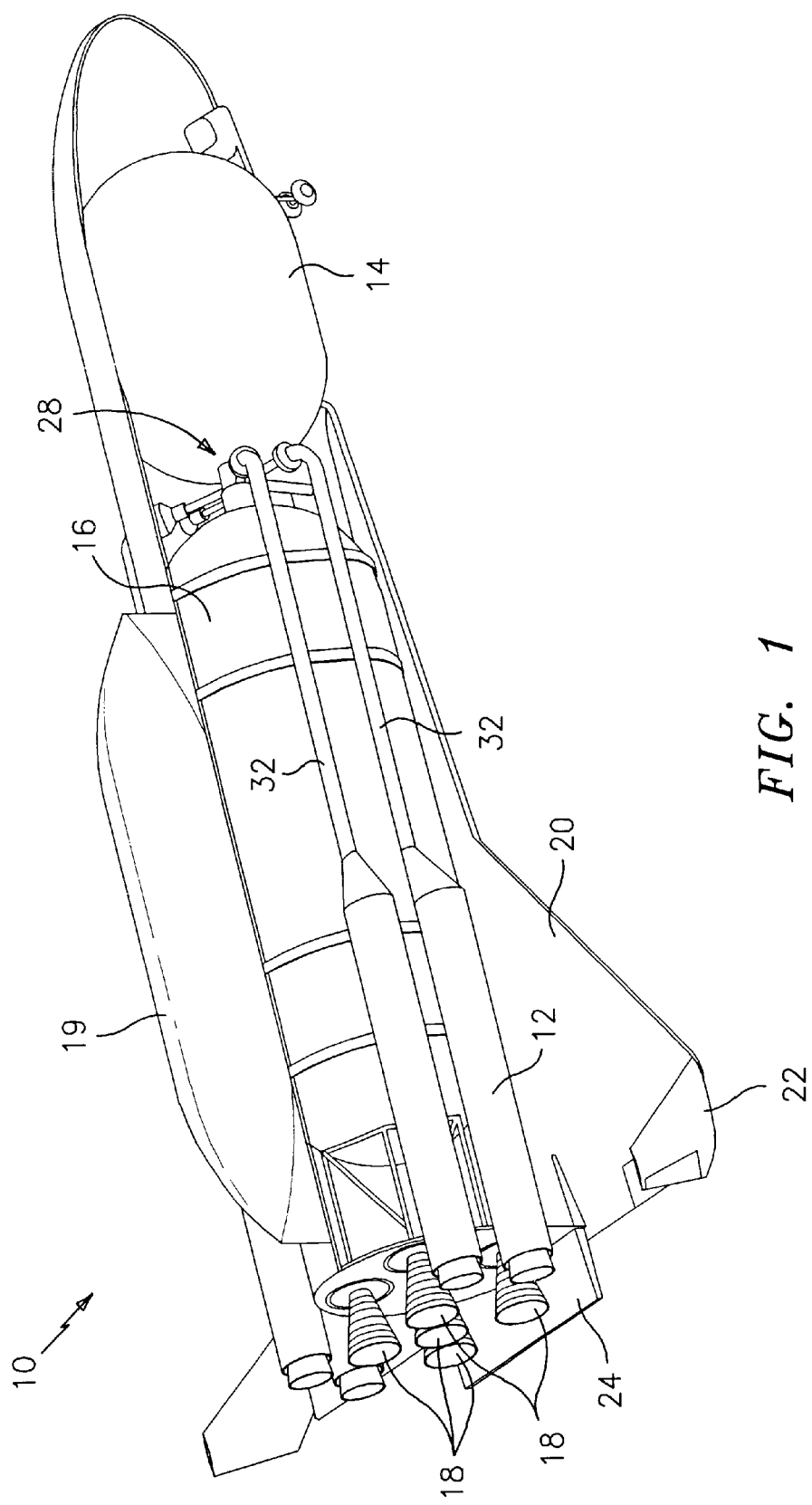
FIG. 1 is a schematic representation of a reusable launch vehicle system in accordance with the present invention.

Referring now to the drawings, the reusable space access launch vehicle system of the present invention includes a single stage reusable launch vehicle 10 to which one or more expendable boost propulsion devices 12 are strapped on. The boost propulsion device(s) forms an expendable half stage.

As can be seen from FIG. 1, the reusable launch vehicle 10 has an internal oxidizer tank 14 containing a liquid oxidizer such as liquid oxygen. The vehicle 10 also has an internal fuel tank 16 such as a liquid hydrogen tank. Still further, the vehicle 10 includes one or more main engines 18 to which the oxidizer tank 14 and the fuel tank 16 are connected via feed lines (not shown) and control valves (not shown).

The launch vehicle 10 has a fairing 19 to which a payload (not shown) may be connected and wings 20 for allowing flight in the Earth's atmosphere. The vehicle 10 also has a plurality of control surfaces 22 and 24 for providing pitch, roll, and yaw control during flight in the Earth's atmosphere. The launch vehicle 10 may or may not have a crew compartment (not shown).

Figure 2:
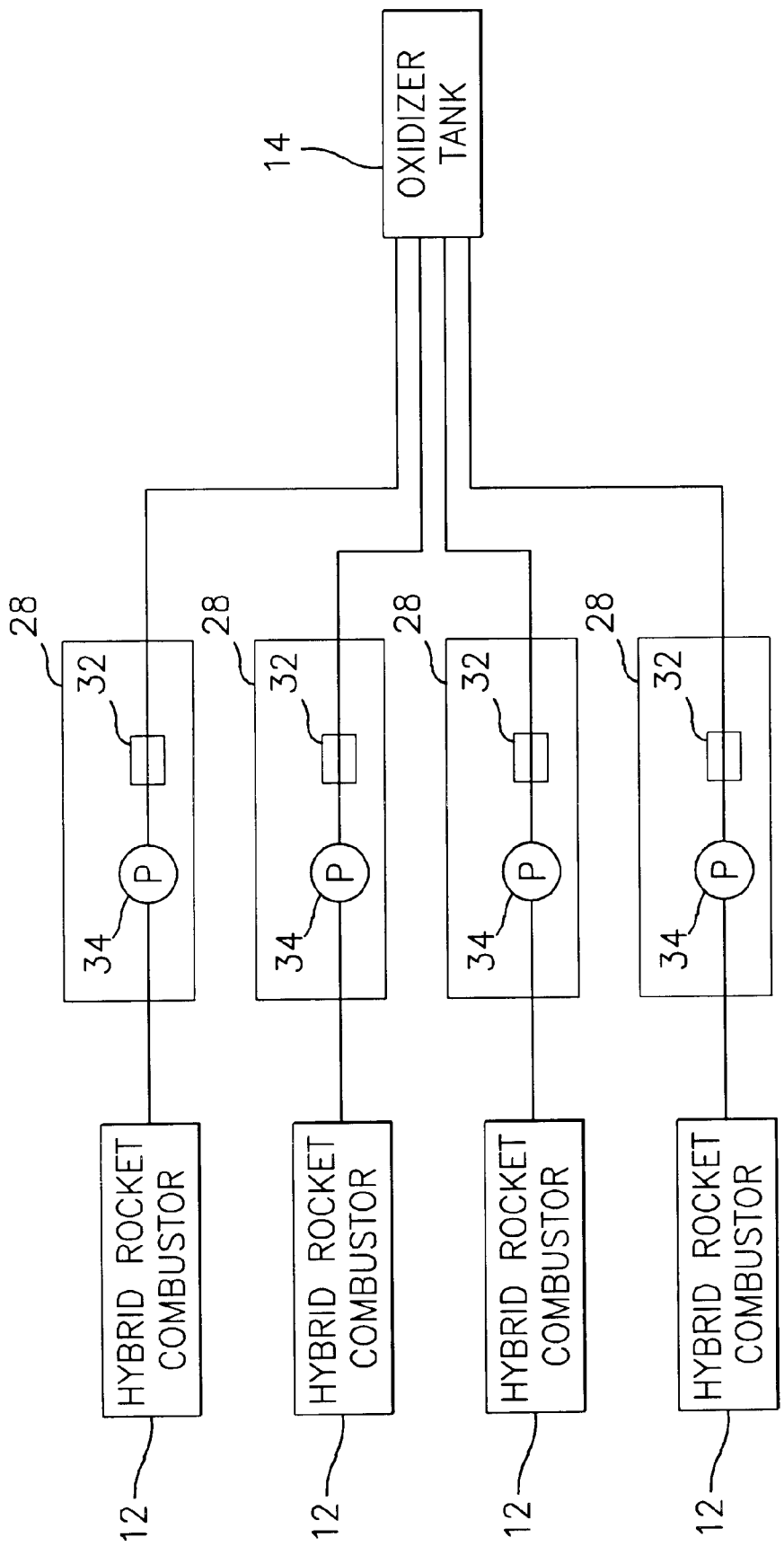
FIG. 2 is a schematic representation of an oxidizer feed system for supplying expendable hybrid rocket combustors used in the reusable launch vehicle system with a gaseous oxidizer.

As previously mentioned, the launch vehicle system of the present invention has one or more expendable boost propulsion devices 12 strapped on to exterior surfaces of the vehicle 10. Preferably, two expendable boost propulsion devices 12 are strapped on to each side of the vehicle 10. The boost propulsion device(s) may comprise any suitable propulsion devices(s) known in the art. In a preferred embodiment of the system of the present invention, each expendable boost propulsion device 12 comprises a hybrid rocket combustor. In order to operate properly, each of the hybrid rocket combustors need to receive oxidizer from the oxidizer tank 14, preferably in a gaseous state for operational robustness and enhanced stability. To this end, the vehicle 10, as shown in FIG. 2, is provided with an oxidizer feed system 28 which includes oxidizer pre-burners 30 and turbo-pumps 34 which communicate with the oxidizer tank 14 and a plurality of feed lines 32 connecting the feed system 28 to the hybrid rocket combustors 12. The feed system 28 and the feed lines 32 are located internally to the vehicle 10 so they can be reused.

Each turbopump 34 provides throttling and/or shutdown capability to each hybrid rocket combustor 12. Each turbopump 34 may be controlled using any suitable control system known in the art.

In operation, during the boost phase, propulsion is provided by the main engines 18 and the expendable boost propulsion device(s) 12. When the expendable boost propulsion device(s) 12 has consumed its fuel, flow of oxidizer from the tank 14 is shutdown via the turbopump(s) 34. The expendable boost propulsion device(s) are then expended using any suitable means known in the art such as explosive bolts for releasing the straps (not shown) mounting each expendable boost propulsion device 12 to the vehicle 10. All fuel lines 32, pre-burners 30 and turbopumps 34 are left with the vehicle 10 to be reused.

The launch vehicle system approach of the present invention may be used for scientific and commercial space exploration applications as well as military space applications. The launch vehicle system of the present invention provides an affordable and cost effective space access vehicle architecture due to the use of low cost expendable boost propulsion devices. Further, the launch vehicle system is safe and reliable.

It is apparent that there has been provided in accordance with the present invention a reusable launch vehicle which fully satisfies the objects, means and advantages set forth hereinbefore. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. A reusable launch vehicle system comprising:
   a reusable vehicle;
   at least one expendable boost propulsion device attached to said reusable vehicle; and
   an oxidizer system onboard said vehicle, said oxidizer system supplying an oxidizer to said at least one expendable boost propulsion device.

2. A reusable launch vehicle system according to claim 1, wherein said oxidizer system comprises means for supplying said oxidizer to said at least one expendable boost propulsion device in a gaseous state.

3. A reusable launch vehicle system according to claim 2, wherein said oxidizer supplying means comprises an oxidizer preburner and a feed line for supplying said gaseous oxidizer to said at least one expendable boost propulsion device.

4. A reusable launch vehicle system according to claim 1, wherein said at least one expendable boost propulsion device comprises a hybrid rocket combustor.

5. A reusable launch vehicle system according to claim 1, wherein said reusable vehicle has at least one main engine and said oxidizer system supplies said oxidizer to said at least one main engine.

6. A reusable launch vehicle system according to claim 1, further comprising:
   said at least one expendable boost propulsion device being at least one hybrid rocket combustor; and
   means for throttling and for shutting down said at least one hybrid rocket combustor.

7. A reusable launch vehicle system according to claim 6, further comprising a plurality of hybrid rocket combustors mounted to said reusable launch vehicle.

8. A reusable launch vehicle system comprising:
   a reusable launch vehicle having at least one engine for providing propulsion during a boost phase;
   two hybrid rocket combustors strapped onto opposite sides of said reusable launch vehicle;
   a liquid oxidizer tank located internally of said reusable launch vehicle; and
   a feed system for supplying liquid oxidizer from said liquid oxidizer tank to each of said hybrid rocket combustors.

9. A reusable launch vehicle system according to claim 8, wherein said feed system comprises an oxidizer pre-burner for each hybrid rocket combustor and feed line extending between each said pre-burner and one of said hybrid rocket combustors.

10. A reusable launch vehicle system according to claim 9, wherein each of said feed lines contains a pump for providing independent throttling and shutdown capability.

11. A reusable launch vehicle system according to claim 8, further comprising a liquid fuel tank located internally to the reusable launch vehicle and each said engine receiving fuel from said fuel tank and oxidizer from said oxidizer tank.

12. A reusable launch vehicle according to claim 11, wherein said fuel tank contains liquid hydrogen and said oxidizer tank contains liquid oxygen.

* * * * *